United States Patent [19]

Roethlisberger et al.

[11] Patent Number: 5,189,941

[45] Date of Patent: Mar. 2, 1993

[54] POWER STEERING GEAR PERMITTING SEPARATE MECHANICAL AND HYDRAULIC BALANCING

[75] Inventors: Jeffrey J. Roethlisberger, St. Charles; Stanley R. Goodrich, Jr., Reese, both of Mich.

[73] Assignee: General Motors Corporation, Detroit, Mich.

[21] Appl. No.: 801,200

[22] Filed: Dec. 2, 1991

[51] Int. Cl.⁵ .............................................. F15B 9/10
[52] U.S. Cl. ................. 91/375 A; 91/358 A
[58] Field of Search ............... 60/392, 393, 401, 400; 91/358 A, 375 R, 375 A, 382, 426; 74/388 PS; 180/132, 141, 142, 143

[56] References Cited

U.S. PATENT DOCUMENTS

| | | | |
|---|---|---|---|
| 4,759,420 | 7/1988 | Schipper, Jr. et al. | 180/143 |
| 4,768,604 | 9/1988 | Schipper | 180/143 |
| 4,793,433 | 12/1988 | Emori et al. | 180/143 |
| 4,796,715 | 1/1989 | Futaba et al. | 180/143 |
| 4,828,068 | 5/1989 | Wendler et al. | 180/148 |
| 4,966,192 | 10/1990 | Umeda | 91/375 A |
| 5,046,574 | 9/1991 | Goodrich et al. | 91/375 A |

FOREIGN PATENT DOCUMENTS 2212463 7/1989 United Kingdom ............ 91/375 A

Primary Examiner—Edward K. Look
Assistant Examiner—F. Daniel Lopez
Attorney, Agent, or Firm—Saul Schwartz

[57] ABSTRACT

A power steering gear with a hydraulic valve and a detent mechanism allows simultaneous hydraulic and mechanical balancing. The hydraulic valve is rotatively separate from the detent mechanism to allow separate balancing. The hydraulic valve is integral with an input member. The detent mechanism is integral with a stub shaft which is concentric with but rotatively independent of the input member. The stub shaft and the input member are rotatively fixed to each other when both the hydraulic valve and the detent mechanism are balanced.

9 Claims, 2 Drawing Sheets

POWER STEERING GEAR PERMITTING SEPARATE MECHANICAL AND HYDRAULIC BALANCING

TECHNICAL FIELD

This invention relates to hydraulically assisted power steering gears with detent mechanisms.

BACKGROUND OF THE INVENTION

A hydraulically assisted power steering gear with a detent mechanism typically has a steering gear input member and a steering gear output member. As vehicle speed increases, the detent mechanism tends to mechanically engage the output member to the input member with increasing force, mechanically positioning the output member with the input member to a mechanically balanced position. The relative orientation between the input member and the output member in the mechanically balanced position is typically determined by plungers or spheroids, rotating with the output member, being pressed into detent recesses in the input member.

A rotary hydraulic valve has a spool portion integral with the input member and a sleeve rotatively fixed to the output member. The hydraulic valve is trying to position the output member relative to the input member simultaneous with the detent mechanism trying to position the output member relative to the input member. If the valve spool portion is not in a hydraulic on center position, that is, not in a hydraulically balanced position, with respect to a valve sleeve, the valve supplies fluid to a bi-directional actuator which causes the output member, and hence the valve sleeve, to rotate back toward the hydraulically balanced position.

Because both the valve spool portion and the recesses in the input member are integral with the input member, the hydraulically balanced position cannot be selectively aligned with the mechanically balanced position by rotating the valve spool portion relative to the recesses.

SUMMARY OF THE INVENTION

This invention permits rotative repositioning of the hydraulically balanced position to the mechanically balanced position by rotatively separating the detent recesses of the input member from the valve portion of the input member. Detent recesses, normally on the input member, are placed on an end of a tubular stub shaft. The tubular stub shaft is largely disposed within the input member except for the end with the detent recesses which extends beyond the input member. The valve spool portion remains integral with the input member.

The output member and tubular stub shaft are first oriented to the mechanically balanced position. The input member is then rotated to the hydraulically balanced position. The tubular stub shaft and the input member are then rotatively fixed to one another.

It is an object of this invention to provide a power steering gear having a tubular stub shaft with detent recesses, having an input member with a valve spool portion, having a hydraulically balanced position controlled by the rotative position of the input member relative to an output member, and having a mechanically balanced position controlled by the rotative position of the tubular stub shaft relative to the output member, the input member being selectively fixed to the tubular stub shaft to align the hydraulically balanced position with the mechanically balanced position.

This and other objects and advantages will be more apparent from the following description and drawings.

DESCRIPTION OF THE PREFERRED EMBODIMENT

Figure 1:
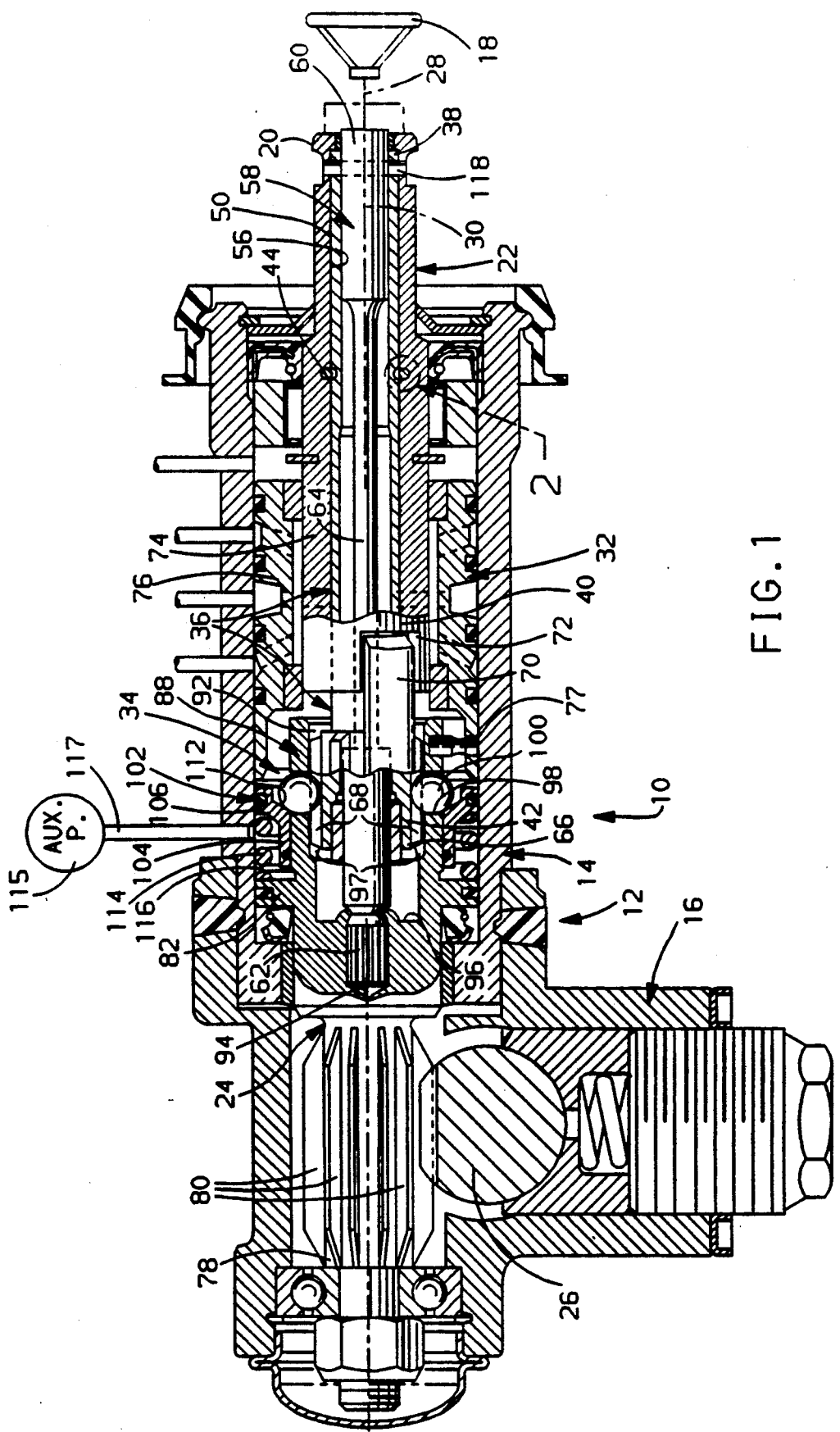
FIG. 1 shows a side sectional view of a steering gear.

A hydraulically assisted power steering rack and pinion steering gear 10 has a main housing 12 with a cylindrical rotary valve portion 14 and an integral rack support portion 16. The steering gear 10 provides a link between a steering wheel 18 and a pair of steerable road wheels (not shown). The steering wheel 18 is rotatively connected to a first end 20 of an input member 22. An output member 24 is connected to the pair of steerable road wheels through a steering gear rack 26 disposed within the integral rack support portion 16 of the main housing 12. The input member 22 and the output member 24 are both disposed within the cylindrical rotary valve portion 14 of the housing and rotatable about a steering gear axis 28 coincident with a center 30 of the cylindrical rotary valve portion 14 of the main housing 12. A rotary valve 32 is disposed between the output member 24 and the input member 22. A suitable rotary valve is described in U.S. Pat. No. 3,022,772, issued to Zeigler et al. on Feb. 27, 1962 and assigned to the assignee of this invention.

A detent mechanism 34 is interposed between the output member 24 and a tubular stub shaft 36. The tubular stub shaft 36, rotatable about the steering gear axis 28, is disposed within the input member 22. Both the input member 22 and the tubular stub shaft 36 have a first end 20, 38 and a second end 40, 42. The first end 38 of the tubular stub shaft 36 is within the first end 20 of the input member 22. The second end 42 of the tubular stub shaft 36 extends beyond the second end 40 of the input member 22.

Detailed descriptions of similar steering gears having detent mechanisms interposed directly between the output member and the input member are found in U.S. Pat. No. 4,768,604 to Schipper on Sep. 6, 1988, and U.S. Pat. No. 4,759,420 to Schipper, Jr. et al. on Jul. 26, 1988, both assigned to the assignee of the present invention.

Figure 2:
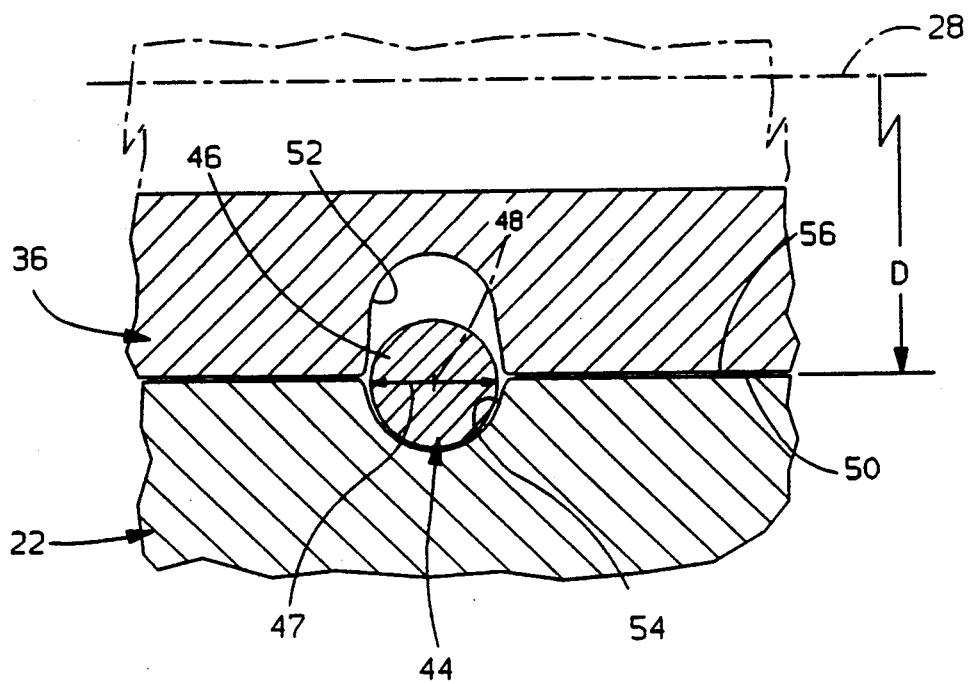
FIG. 2 shows an enlarged view of a portion of FIG. 1 where a tubular stub shaft and an input member are axially linked by a retaining ring.

A retaining ring 44 is disposed between the tubular stub shaft 36 and the input member 22. The ring 44 is formed of wire 46 with a constant diameter 47. A center 48 of the wire 46 forms a diameter D equal to an outside diameter 50 of the tubular stub shaft 36 as best seen in FIG. 2. The ring 44 is split to allow radial expansion and contraction. The tubular stub shaft 36 accommodates the ring 44 with a tubular stub shaft retaining ring groove 52 circumscribed about the outside diameter 50 of the tubular stub shaft with a minimum depth equal to the wire diameter 47. The input member 22 accommodates the ring 44 with an input member retaining ring groove 54 circumscribed about an inside diameter 56 of the input member 22, with a depth of about one half the wire diameter 47.

A torsion rod 58 with a first end 60 and a second end 62 is disposed within the tubular stub shaft 36 such that the first end 60 of the torsion rod 58 is axially aligned with the first end 20 of the input member 22 and the first end 38 of the tubular stub shaft 36. The first end 60 and the second end 62 of the torsion rod 58 are larger in diameter than a center portion 64 of the torsion rod 58.

The second end 62 of the torsion rod 58 extends beyond the second end 42 of the tubular stub shaft 36 and into the output member 24. The second end 62 of the torsion rod 58 is rotatively fixed to the output member 24. The torsion rod 58 rotatively supports the second end 40 of the tubular stub shaft 36.

Figure 3:
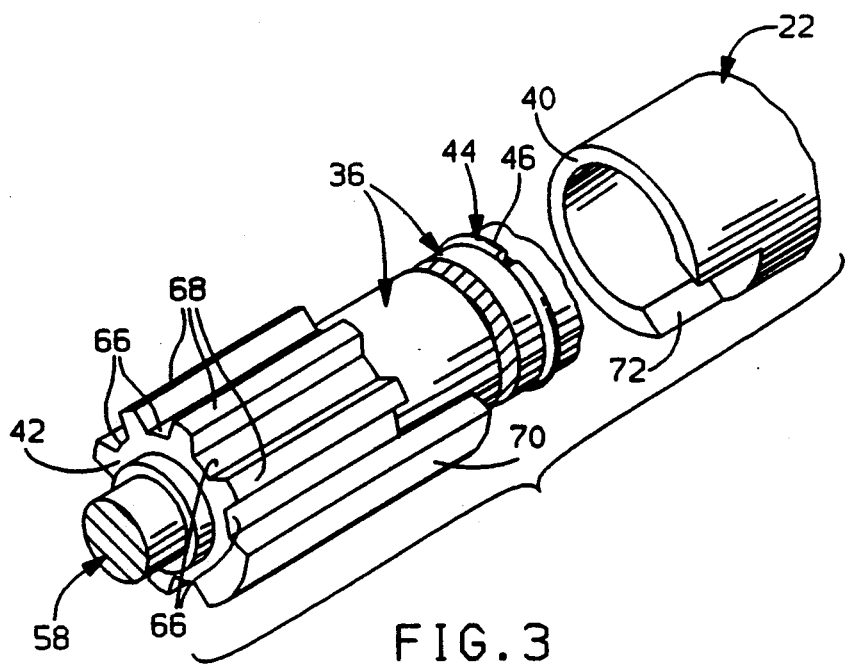
FIG. 3 shows a partially exploded isometric view of the input member, the tubular stub shaft and a torsion rod.

The second end 42 of the tubular stub shaft 36 has detent recesses 66 between radial splines 68, as best seen in FIG. 3. The second end 42 of the tubular stub shaft 36 has a block tooth 70 extending beyond the detent recesses 66 toward the first end 38 of the tubular stub shaft 36, also best seen in FIG. 3. The input member 22 has a block tooth groove 72 accommodating the block tooth 70. With the block tooth 70 inserted in the block tooth groove 72, the relative rotation between the input member 22 and the second end 42 of the stub shaft 36 is limited to 7°.

A valve spool portion 74 of the input member 22, proximate to the second end 40 of the input member 22, cooperates with an encircling valve sleeve 76 to function as the rotary valve 32. The valve sleeve 76 is rotatively fixed to the output member 24. The valve sleeve 76 and the output member 24 axially overlap to accommodate a drive pin 77 passing between the two of them 76 and 24. The cylindrical rotary valve portion 14 of the housing 12 serves as a valve housing to the rotary valve 32, aiding in the routing of fluid between the valve 32 and a steering actuator, or steering piston within a cylinder (not shown).

The valve sleeve 76 and the valve spool portion 74 have a hydraulically balanced position relative to each other where fluid is ported equally to both sides of the steering piston. The torsion rod 58, when fixed at its first end 60 to the first end 20 of the input member 22, maintains the valve spool portion 74 and valve sleeve 76 in the hydraulically balanced position in an absence of steering wheel torque. An application of torque to the steering wheel 18 by the vehicle operator tends to torsionally deflect the center portion 64 of the torsion rod 58, producing relative rotative displacement between the valve sleeve 76 and the valve spool portion 74. A torsional stiffness of the center portion 64 controls a steering effort required by a vehicle operator to steer the road wheels.

Displacement away from the hydraulically balanced position results in fluid being ported principally to a selected side of the steering piston. Porting pressurized fluid to one side of the steering piston results in the steering piston being stroked, or displaced. The steering piston in turn axially displaces the rack 26, thereby rotating the output member 24 and the valve sleeve 76 until the hydraulically balanced position is again achieved. Determination of the input member 22 to output 24 member orientation corresponding to the hydraulically balanced position is usually done on a flow bench by varying the input member 22 to output member 24 orientation until flow to both sides of the piston is equalized.

The output member 24 has a pinion portion 78 with teeth 80 engaging the rack 26. The output member 24 has a flange 82 proximate to the pinion portion 78. The flange 82 is circumferentially sealed with the cylindrical rotary valve portion 14 of the housing 12. Opposite the flange 82 from the pinion portion 80 is a detent portion 88 of the output member. The detent portion 88 of the output member 24 is proximate to the second end 40 of the input member 22.

The output member 24 has a cavity 92 in the detent portion 88, centered about the steering gear axis of rotation 28. The cavity 92 is sufficiently large to accommodate the insertion of the second end 42 of the tubular stub shaft 36. A blind hole 94 at a bottom 96 of the cavity 92 accommodates insertion of the second end 62 of the torsion rod 58 into the output member 24. The cavity 92 has radial splines 97 complementary to the splines 68 of the stub shaft 36 which limit relative rotation between the output member 24 and the stub shaft 36 to 3°.

The detent portion 88 of the output member 24 has sockets 98 corresponding in number and location to the detent recesses 66 in the tubular stub shaft 36. The sockets 98 lie in a plane perpendicular to the steering gear axis of rotation 28 and are oriented radially about the steering gear axis of rotation 28. Spheroids 100, or detent engaging elements, are disposed in the sockets 98, and protrude beyond the sockets 98 even when the spheroids 100 are pressed into the detent recesses 66. When the sockets 98 are aligned with the recesses 66 in the tubular stub shaft 36, the spheroids 100 simultaneously protrude uniformly beyond the detent portion 88 of the output member 24.

An annular piston 102 has a piloting portion 104 joined to a dish portion 106. The piloting portion 104 pilots on the detent portion 88 of the output member 24. The piloting portion 104 of the annular piston 102 is slidably disposed between the sockets 98 and the output member flange 82. The piloting portion 104 is sealed against the output member 24. The dish portion 106 is sealed against the cylindrical rotary valve portion 14 of the housing 12. The dish portion 106 of the annular piston 102 has a chamfered side 112 facing the sockets 98. The chamfered side 112 contacts the spheroids 100.

A spring 114 between the output member flange 82 and the annular piston 102 provides a spring force pressing the chamfered side 112 of the annular piston 102 against the spheroids 100, in turn pressing the spheroids 100 into the detent recesses 66. Force from the spring 114 against the annular piston 102 seats the spheroids 100 in the detent recesses 66, thereby rotating the tubular stub shaft 36 to a mechanically balanced position relative to the output member 24. A detent apply chamber 116 between the output member flange 82 and the annular piston 102 is supplied with fluid at a pressure which increases with vehicle speed The pressure increases the force against the annular piston 102, increasing the force against the spheroids 100. A means for supplying fluid at a pressure which increases with vehicle speed is provided by an auxiliary pump 115 to the chamber 116 through a detent pressure port 117 as described in U.S. Pat. No. 4,768,604 and U.S. Pat. No. 4,759,420.

Alignment of the mechanically balanced position with the hydraulically balanced position is achieved in the following manner. The steering gear 10 is completely assembled except for fixing the first ends 20, 38, 60 of the input member 22, the stub shaft 36, and the torsion rod 58 together. The output member 24 is held in place during the alignment procedure. The spring 114 acting against the annular piston 102 forces the detent mechanism 34, and consequently the stub shaft 36 and the output member 24, into the mechanically balanced position.

After mounting the steering gear 10 on a flow bench, with the stub shaft 36 and the output member 24 remaining in the mechanically aligned position, the input member 22 is rotated relative to the output member 24 until the hydraulically balanced position is reached. The torsion rod 58, rotatively fixed at its second end 62 to the output member 24 remains in a neutral position, uncoupled at its first end 60. The torsion rod 58 has no residual torsion within it in the neutral position. With the stub shaft 36 and the input member 22 and the torsion rod 58 being simultaneously so aligned, their first ends, 20, 38, 60 are cross drilled accommodating a locking pin 118 rotatively fixing the first ends 20, 38, 60 of the three members 22, 36, 58 to each other. This done, torque induced in the torsion rod 58 by rotatively displacing the first ends 20, 38, 60 relative to the output member 24 restores the steering gear 10 to both the hydraulically balanced and the mechanically balanced positions simultaneously when the steering wheel 18 is released.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A detent mechanism in a hydraulically assisted power steering gear for an automotive vehicle, the power steering gear being of the type having
    an input member with a first end and a second end, rotatable about a steering gear axis and connected to a steering wheel,
    an output member rotatable about the steering gear axis, connected to a pair of steerable road wheels, and proximate to the second end of the input member,
    a rotary valve including a valve sleeve rotatable as a unit with the output member and a valve spool portion rotatable as a unit with the input member, having a hydraulically balanced position between the valve sleeve and the valve spool portion, and
    a torsion rod aligned on the steering gear axis with a first end of the torsion rod disposed within the first end of the input member and a second end of the torsion rod attached to the output member,
    the detent mechanism comprising:
    a tubular stub shaft having a first end and a second end, aligned with the steering gear axis, having a detent recess on the second end, having the first end of the tubular stub shaft radially interposed between the first end of the input member and the first end of the torsion rod, and with the second end of the tubular stub shaft extending beyond the second end of the input member;
    a detent engaging element rotating with the output member, accommodated in the output member by a socket alignable with the detent recess;
    a spring urging the detent engagement element into the detent recess, thereby rotatively aligning the tubular stub shaft with the output member to a mechanically balanced position; and
    a pin passing through and thereby rotatively linking the input member, the first end of the tubular stub shaft, and the first end of the torsion rod such that the tubular stub shaft is rotatively aligned with the output member in the mechanically balanced position, simultaneous with the rotary valve being in the hydraulically balanced position, simultaneous with the torsion rod being in a neutral position.

2. A detent mechanism within a steering gear as in claim 1, further comprising:
    a plurality of sockets in the detent portion of the output member, a corresponding plurality of detent engaging elements, and a corresponding plurality of detent recesses in the stub shaft.

3. A detent mechanism as described in claim 2, further comprising:
    a block tooth groove in the second end of the input member, proximate to the second end of the tubular stub shaft; and
    a block tooth on the tubular stub shaft, axially engaging the block tooth groove of the input member, limiting rotation between the tubular stub shaft and the input member.

4. A detent mechanism as described in claim 3, further comprising:
    the tubular stub shaft having a tubular stub shaft retaining ring groove circumscribing an outside diameter of the tubular stub shaft;
    the input member having an input member retaining ring groove circumscribing an inside diameter; and
    a retaining ring with a split allowing elastic expansion and contraction in a radial direction, simultaneously disposed in both the input member retaining ring groove and the tubular stub shaft retaining ring groove.

5. A detent mechanism within a steering gear as in claim 4, further comprising:
    means for supplying fluid at a pressure which increases with vehicle speed, the fluid urging the detent engaging elements into the detent recess.

6. A detent mechanism as described in claim 5, the detent engaging elements being spheroids located in the sockets in the output member, the sockets permitting movement of the spheroids into and out of the detent recesses.

7. A detent mechanism as described in claim 6, further comprising:
    an annular piston encircling the output member, being urged along the steering gear axis against the spheroids by both the spring and the fluid increasing in pressure with vehicle speed, the annular piston in turn urging the spheroids into the detent recesses, thereby aligning the tubular stub shaft with the output member to the mechanically balanced position.

8. A detent mechanism within a steering gear as in claim 7, further comprising:
    the detent recesses in the tubular stub shaft being between radial splines;
    the detent portion of the output member having a cavity centered about the axis of rotation able to accommodate insertion of the second end of the torsional stub shaft, having a plurality of radially directed sockets, having radial splines complementary to the radial splines in the tubular stub shaft limiting relative rotation between the stub shaft and the output member; and
    the second end of the stub shaft disposed within the cavity of the output member.

9. A detent mechanism within a steering gear as in claim 8, further comprising:
    the annular piston having a chamfered side contacting the spheroids.

* * * * *